Patented Sept. 17, 1935

2,014,629

UNITED STATES PATENT OFFICE 2,014,629

PROCESS OF DEWAXING LUBRICATING OIL

John M. Musselman, Cleveland, Ohio, assignor to The Standard Oil Company, Cleveland, Ohio, a corporation of Ohio No Drawing. Application March 31, 1933, Serial No. 663,857

4 Claims. (Cl. 196—21)

The elimination of wax from lubricating oils constitutes a particular difficulty where amorphous wax is concerned. It is impossible to separate such wax by thinning with a diluent and filter-pressing. Where the amount present is not large it has been customary to resort to gathering agents or filtering aids, and chilling and centrifuging in the effort to entrap and remove the non-crystalline with the crystalline forms insofar as possible. Such measures are cumbersome of operation, and unsatisfactory. In accordance with the present invention however, it now becomes possible to meet this difficulty in a manner direct and advantageous in operation.

To the accomplishment of the foregoing and related ends, the invention, then, comprises the features hereinafter fully described, and more particularly pointed out in the claims, the following description setting forth in detail certain illustrative embodiments of the invention, these being indicative however, of but a few of the various ways in which the principle of the invention may be employed.

A lubricating oil stock containing wax to be removed, is subjected to the action of a metallic halide, as aluminum chloride or other halide, or halide in some cases of other metals, as iron, tin, titanium, antimony, boron, etc., or in some instances powdered metal and a halide for the generation of nascent metallic halide. The amount of aluminum chloride or the like to be employed may vary somewhat depending upon the particular oil conditions encountered, for example from 3 to 20 per cent, and ordinarily 3 to 10 per cent. With the metallic halide supplied to the oil, and provision for application of heat by suitable means, the treatment is carried on at an elevated temperature. Temperatures of 350–500° F. may be employed, and particularly 375–425, a temperature around 400° F. being generally desirable. With suitable admixture and stirring, the treatment is carried on, for instance for ½ to 6 hours, depending upon the temperature and oil conditions. The sludge is separated, and may be re-used on other portions of oil, it being advantageous to progressively treat successive portions in inverse order, the newest oil being treated with the oldest halide, to an efficient utilization.

The oil freed from the sludge is thinned, if necessary, by addition of a light distillate, as kerosene, light gas oil or naphtha, and is chilled, and the wax is then filtered out, as by filter-pressing. The nature of the changes occurring in the molecular structure is such that amorphous form of wax disappears, such that the wax is easily separated by ordinary filter-pressing. A decolorizing agent, such as .5 per cent of clay, may be added if desirable and the oil finally reduced by distillation to desired specification, and finished by filtering through a blotter press to remove any suspended matter or moisture.

As an example: A wax slop of gravity 21.8, viscosity 119 at 210° F., viscosity-gravity constant 0.848, and carbon residue 1.84 per cent, and cold test of solid at 110° F., is treated with 10 per cent aluminum chloride at about 400° F. for about 60 minutes. The oil is thinned with about 50 per cent of a naphtha of 49.3 Bé. gravity, is chilled to about 0° F. and filter-pressed. The filtrate is reduced by distillation to a gravity of 25, a viscosity of 1355 at 100° F., viscosity of 98 at 210° F., viscosity index 85, viscosity-gravity constant 0.835, flash 490, color 3, and cold test of solid at 0° F. or pour at 5° F.

As another example: A wax-containing distillate of 25 gravity, 80 viscosity at 210, 0.848 viscosity-gravity constant, 0.93 per cent carbon residue, and cold test of solid at 100° F., is heated with 20 per cent of an aluminum chloride sludge from a previously treated batch, heating being continued for 120 minutes at about 400° F. The oil is cooled and thinned with about 50 per cent of a naphtha of 49.3 Bé. gravity, and chilled to about 0° F. The filtrate is reduced by distillation to a specification of 30.2 gravity, 384 viscosity at 100° F., 59½ viscosity at 210° F., 110 viscosity-index, 0.804 viscosity-gravity constant, 490 flash, 0.12 carbon residue, and color 3, and cold test of pour 5 or solid at 0° F.

Not only is the wax thus efficiently eliminated, but the product shows an exceptionally good viscosity index (the ratio of viscosity at 100° F. compared with viscosity at 210° F., as described for instance in Chemical and Metallurgical Engineering, vol. 36, page 618), and viscosity-gravity constant (the ratio of viscosity at 100° compared with specific gravity at 60° F. as described for instance in Journal of Industrial and Engineering Chemistry, vol. 20, page 641). Especially good color and low Conradson carbon results.

Other modes of applying the principle of the invention may be employed, change being made as regards the details described, provided the features stated in any of the following claims, or the equivalent of such, be employed.

I therefore particularly point out and distinctly claim as my invention:—

1. A process of de-waxing mineral lubricating oils containing amorphous wax, which comprises eliminating amorphous wax by chemical attack of substantially anhydrous aluminum chloride, and separating the residual wax.

2. A process of de-waxing mineral lubricating oils containing amorphous wax, which comprises eliminating amorphous wax by chemical attack of substantially anhydrous aluminum chloride at a temperature of 350–500° F., and separating the residual wax.

3. A process of de-waxing mineral lubricating oils containing amorphous wax, which comprises eliminating amorphous wax by chemical attack of 3–10 per cent of substantially anhydrous aluminum chloride at a temperature of about 400° F. for ½ to 4 hours, chilling and separating the residual wax.

4. A process of de-waxing mineral lubricating oils containing amorphous wax, which comprises eliminating amorphous wax by chemical attack of 3–10 per cent of substantially anhydrous aluminum chloride at a temperature of about 400° F. for ½ to 4 hours, thinning with a light distillate, chilling, and filtering.

JOHN M. MUSSELMAN.